United States Patent
Yoshihama

(10) Patent No.: US 9,223,987 B2
(45) Date of Patent: Dec. 29, 2015

(54) CONFIDENTIAL INFORMATION IDENTIFYING METHOD, INFORMATION PROCESSING APPARATUS, AND PROGRAM

(71) Applicant: International Business Machines Corporation, Armonk, NY (US)

(72) Inventor: Sachiko Yoshihama, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/685,055

(22) Filed: Nov. 26, 2012

(65) Prior Publication Data

US 2013/0152158 A1    Jun. 13, 2013

(30) Foreign Application Priority Data

Nov. 28, 2011   (JP) .................................. 2011-258813

(51) Int. Cl.
*G06F 21/60*   (2013.01)
*G06F 21/62*   (2013.01)

(52) U.S. Cl.
CPC ............ *G06F 21/60* (2013.01); *G06F 21/6245* (2013.01)

(58) Field of Classification Search
CPC .............................. G06F 21/6245; G06F 21/60
USPC .................................... 726/1, 22, 26; 713/189
See application file for complete search history.

(56) References Cited

U.S. PATENT DOCUMENTS

| | | | |
|---|---|---|---|
| 7,827,136 B1 | 11/2010 | Wang et al. | |
| 2009/0144619 A1 | 6/2009 | Best et al. | |
| 2011/0040983 A1* | 2/2011 | Grzymala-Busse et al. | .. 713/189 |
| 2012/0124047 A1* | 5/2012 | Hubbard | ........................ 707/737 |

FOREIGN PATENT DOCUMENTS

| | | |
|---|---|---|
| CN | 1601520 | 3/2005 |
| CN | 102567663 | 7/2012 |
| JP | 2009116680 | 5/2009 |
| WO | 2009136258 | 11/2009 |

OTHER PUBLICATIONS

United Kingdom Combined Search and Examination Report dated Apr. 2, 2013, received for Application No. GB1220817.9.

* cited by examiner

*Primary Examiner* — Brandon Hoffman
*Assistant Examiner* — Nega Woldemariam
(74) *Attorney, Agent, or Firm* — Fleit Gibbons Gutman Bongini & Bianco PL; Jon A. Gibbons

(57) ABSTRACT

An information processing apparatus includes a clustering unit configured to read messages from a log and to classify the read messages into clusters according to similarities of the messages; a variable portion finding unit configured to find a portion variable between messages; an attribute determination unit configured to estimate and determine a confidential attribute of the variable portion by using predefined rule; and an attribute estimation unit configured to, in a case where there is a portion whose confidential attribute is undeterminable by using the rules, estimate the confidential attribute of the portion having the undeterminable confidential attribute with use of either a correspondence between appearance locations in the messages, or a co-appearance relation of a portion having a determined confidential attribute and the portion having the undeterminable confidential attribute.

17 Claims, 10 Drawing Sheets

224

| Attribute | Area representation |
|---|---|
| Personal name | Alice |
|  | Bob |
|  | John Doe |
| IP address | [0-9]+,¥,[0-9]+,¥,+[0-9]+,¥,+[0-9]+ |
| email address | [a-zA-Z_-]+@[a-zA-Z_-]+ |
| non-confidential message | Failed login attempt |
|  | User Profile for * is updated |
| ⋮ | ⋮ |

- 400 (Personal name rows)
- 410 (IP address, email address rows)
- 420 (non-confidential message rows)

FIG. 4

FIG. 10

CONFIDENTIAL INFORMATION IDENTIFYING METHOD, INFORMATION PROCESSING APPARATUS, AND PROGRAM

CROSS-REFERENCE TO RELATED APPLICATIONS

This application is based upon and claims priority from prior Japan Patent Application No. 2011-258813, filed on Nov. 28, 2011, the entire disclosure of which is hereby incorporated by reference herein.

FIELD OF THE INVENTION

The present invention relates generally to a technique of identifying confidential information, and more specifically relates to a technique of allowing an information processing apparatus to identify confidential information included in accumulated logs.

BACKGROUND OF THE INVENTION

Nowadays, various kinds of information are shared through networks such as the Internet, an intranet, and a LAN, and are thus getting more usable and accessible. A server for managing contents and the like to be provided is used to manage information and provide the information to information users on the Internet or the like. The server accepts an access from a client device connected to the server through a network, and executes processing such as provision of requested contents, user registration, or registration/update of personal information.

Conceivable servers connected to the network include a mail server enabling the sending/receiving of emails using SMTP; a web server implementing a Common Gateway Interface (CGI) and the like for providing web services using the HTTP protocol; an FTP server; and a database server managing various kinds of data and providing the data in response to an access request. Every time these servers execute processing, the servers accumulate therein information on users accessing the servers, authentication results, data contents sent for the processing, execution results, and the like. The information thus accumulated differs depending on the types of the servers, but mainly includes a source IP address, a source domain name, an access time stamp, an accessed file name, a link source URL, a web browser name and an OS name of a visitor, the time spent for the processing, the number of received bytes, the number of transmitted bytes, and a service status code, and the like. An information processing apparatus such as a server accumulates information through operations and record it in a file, database, or alike, which is simply referred to as a log hereafter.

As described above, logs created by a server include high use-value information to a great extent. Hence, through log analysis, the logs are applicable to, for example, examine a history of malicious attacks such as distributed denial-of-service attack (DDoS) attacks to the server, or a history of unauthorized access to the server, or to carry out market analysis by statistical analysis on information on accesses to the server, and the like.

Besides, with respect to illegal accesses etc., to servers which frequently occur recently, logs may also be usable to survey time-sequenced changes and target transitions of attackers on the network more comprehensively by analyzing transversely the logs obtained at plural organizations. However, since a log may include basic network information and personal information as described above, there is a risk of data leakage through disclosure of logs to an external analysis vendor for log analysis, or disclosure of logs across multiple domains even if the domains are reliable.

FIG. 10 shows an example of an access log 1000 of a web server implemented using Apache 2.0 and a transaction log 1100 of an FTP server. In FIG. 10, network information, private information, and port information are replaced with asterisks "*" to conceal them. As shown in FIG. 10, a log may include server backbone information such as a fixed IP address of a server, a port number being used, and a hierarchical directory structure, and also include private information such as a user ID and extremely highly confidential information such as a password. However, since a large variety of information can be recorded in a log, the location of string in a log where highly confidential information is included is different depending on the content of the log.

For example, disclosure of the raw logs of FIG. 10 to an external party poses a risk to a company because it means disclosure of network information, server information, personal information, and the like of a company or organization to external parties. In addition, if the logs are leaked to malicious attackers, there are risks that high value-added information accumulated by a company may be destroyed and be plagiarized by hacking, and the company may be targeted by denial-of-service (DoS) attacks and the like.

Hence, by providing a raw log to an external analysis vendor, a company or organization using a server can get useful information but, in return, has to face high risks of confidential information leakage, privacy information leakage, information leakage by an unauthorized access to the server, and the like. For these reasons, even if disclosure of a log to a third party aims to analyze a history of accesses to a server and to reflect the analysis result on functions of the server, the disclosure still faces a high hurdle beyond the coverage of a nondisclosure agreement, which impedes flexible log analysis. Further, if highly confidential information can be found in log information, the highly confidential information may be collectively replaced with asterisks or the like. In such a case, however, the log sometimes loses information indicating the identity of the accessing person or the identity of the accessed data. Thus, it is preferable to conceal log information in a way such that the attributes of the original data as well as the identicalness of original data is kept recognizable.

Methods of judging a confidentiality level of a log have been heretofore known. For example, Japanese Patent Application Publication No. 2009-116680 (Patent Literature 1) aims to provide a technique for easily and precisely detecting a data type of an input/output data of a computer, such as the presence/absence of confidentiality to contribute to proper management of the data. The technique described in Patent Literature 1 is for judging the data type precisely by the machine learning and includes; reading means for reading the input/output data; data contents acquiring means for acquiring a character sequence included in the input/output data; feature extracting means for extracting, as a feature, the character string or a given character group included in the character string; and data type judging means for judging a data type of the feature by referring to data type learned results stored in an external storage device and obtained by machine learning using training data whose data types are previously known.

The method described in Patent Literature 1 enables judgment of confidentiality of information in a log. However, since the training data is used for judgment, it is not possible to judge confidentiality of information not included in the training data, leaving a risk of confidential information leakage. Besides, a technique of detecting a confidential words based on regular expressions and a word list is not a sufficient solution because it has limits due to a huge amount of effort for data construction, omission of words, and the like in registering types of regular expressions and registering words in a word list. It is also conceivable to define a perfect schema for a log in advance and anonymize confidential information in accordance with the schema; but it is not realistic to create a variety of perfect schemata for a variety of logs to be created. Further, no matter how many words or schemata are added, there are numerous uncommon names. Furthermore, it is also necessary to deal with a log containing wrongly inputted information such as a mistyped user ID/password and data inputted in a wrong field.

BRIEF DESCRIPTION OF THE DRAWINGS

FIG. 4 is a view showing a list of variable portions, such as words, strings and regular expressions, registered with a judgment rule 224 of the embodiment of the present invention.

FIG. 10 is a view showing an access log 1000 of a web server implemented using Apache 2.0, for example, and a transaction log 1100 of a FTP server.

DETAILED DESCRIPTION OF THE EMBODIMENTS

Figure 1:
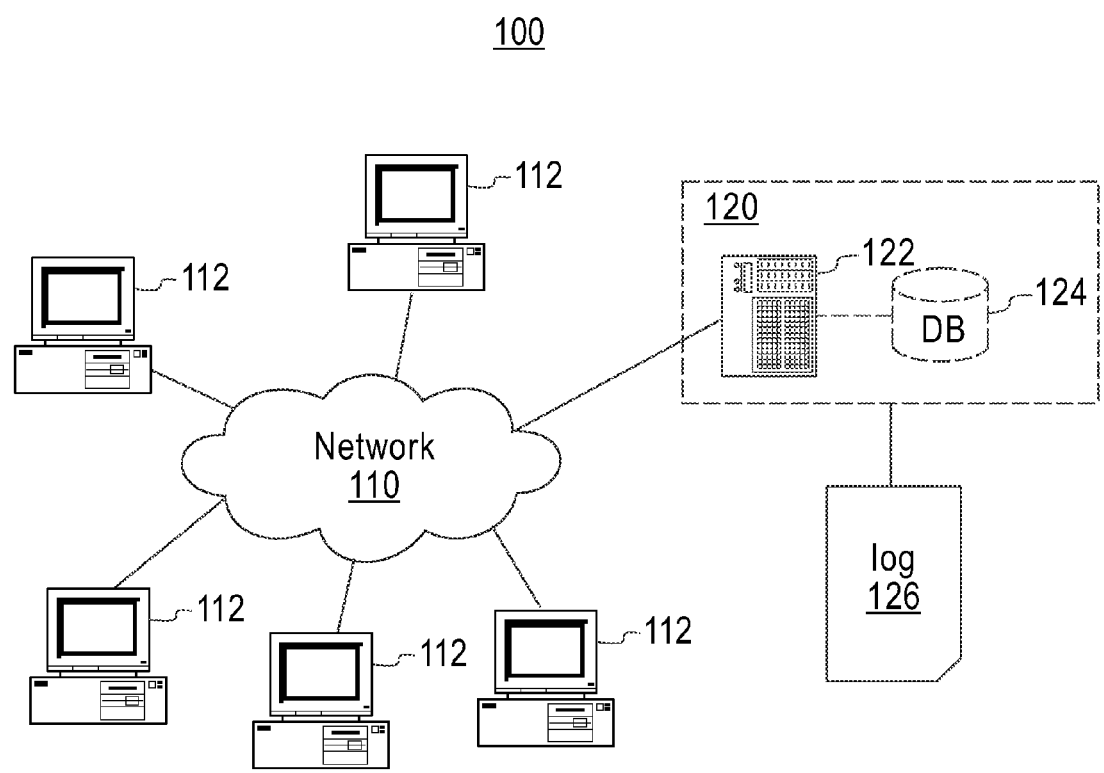
FIG. 1 is a view showing an embodiment of an information processing system 100 according to an embodiment of the present invention.

The present invention has been made in consideration of the foregoing problems of the related arts, and aims to provide a confidential information identifying method, an information processing apparatus and a program, which enable expansion of usability of logs without impairing the usefulness of the logs by identifying confidential information included in the logs.

In order to solve the above problems, the present invention identifies whether or not personal information in a log is confidential information. The judgment on whether the personal information in the log is confidential is made as follows. Specifically, messages in the log are classified into clusters according to similarities of the messages. The messages in each of the clusters are compared with each other, and fixed portions and variable portions in the messages are identified based on a difference between the messages. Then, a confidential level of each of the variable portions is determined while referring to words, strings, or code information registered with a judgment rule. Thereafter, an appearance location of the words, strings, or code information determined as confidential based on the words, strings, or code information registered with the judgment rule is judged as a confidential portion in the messages in the cluster, and this judgment is applied to other messages in the cluster. In other words, a character string situated in the confidential portion in each of the other messages in the cluster is judged as confidential even though the character string has not been determined as confidential by the judgment rule.

Further, the character string situated in the confidential portion in each of other messages in the cluster is registered with the judgment rule. This makes it possible to determine the same character string which appears in another message as confidential.

Figure 10:
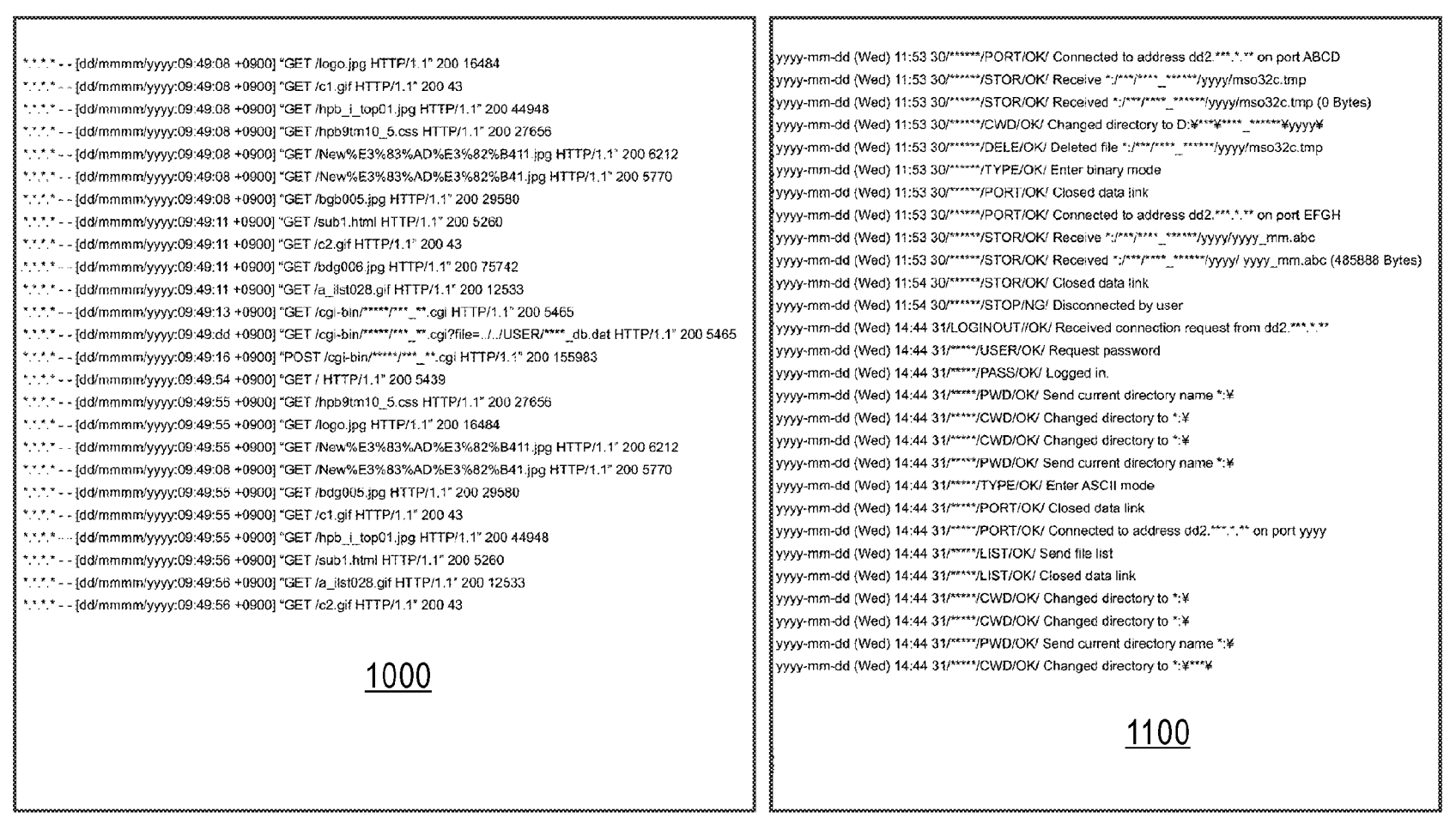

An area having been judged as a confidential area is replaced with another representation with a format suitable for information in the area. At this time, if the information is completely masked, the amount of information becomes small as shown in FIG. 10 and usefulness of the information as the log is significantly impaired. To cope with this, the information can be replaced with another representation having a type or meaning as similar as possible to that of the original information, i.e., having the same semantics. The replacement with another representation having the same type or meaning as that of the original information enables replacement such that the type of the information after the replacement can be determined and identified. For example, a personal name is mapped to another personal name, e.g., "Alice" → "Cathy," "Bob"→"David."

In the case of an IP address, while a specific portion of a network structure of the IP address is left unchanged, the other portion is replaced with code information or the like which constitutes a private IP address or the like and has a certain rule of regular expression. Thereby, confidential information including an estimated portion can be masked.

Further, regarding information not registered with the judgment rule, the present invention estimates a confidential attribute of an area whose confidential attribute is not determinable from the judgment rule by using an appearance location of the area in a message and its co-appearance relation with confidential words. This makes it possible to enhance the usability of a log while preventing a confidential area of the log from being leaked to external parties.

Hereinbelow, an embodiment of the present invention will be described; however, the present invention is not limited to the embodiment described later. FIG. 1 shows an embodiment of an information processing system 100 to which a confidential information identifying method of the embodiment of the present invention is applied. A server function unit 120 is connected to a network 110. Upon request from client devices 112 connected to the network 110, the server function unit 120 provides the client devices 112 with web services, storage services, search services, and other services.

The server function unit 120 includes a server device 122 and a database 124 whose data is managed by an application such as a database application implemented by the server device 122. The database 124 can store therein contents to be provided, and also security information such as user registration information, user information update information, and access control information.

The server device 122 shown in FIG. 1 may be formed of an information processing apparatus such as a blade server, a rack-mount server, and a versatile computer, and can be controlled by an operating system such as WINDOWS® 200X, UNIX®, or LINUX®. In addition, the server device 122 can be implemented as a proxy server or a gateway server for distributed computing, or as a web server, as long as the device is capable of processing search requests from the client devices 112 and returning processing results to the client devices 112.

Each client device 112 can be implemented as any personal computer or workstation including a microprocessor such as a single-core processor or a dual-core processor, a RAM, and a hard disk drive. Alternatively, the client device 112 can be implemented as a PDA or a smartphone. The client device 112 can be controlled by any operating system such as WINDOWS®, UNIX®, LINUX®, MAC OS®, and ANDROID®.

The client device 112 and the server function unit 120 may be connected to each other through the network 110 by using a transaction protocol such as TCP/IP. Further, data transactions between the client device 112 and the server device 122 can be established by using a distributed computing environment such as Remote Method Invocation (RMI), Remote Procedure Call (RPC), Enterprise Java Beans (EJB), or Common Object Request Broker Architecture (CORBA).

In another embodiment, the server device 122 and the client device 112 may have a configuration of using the HTTP protocol with a web browser installed in the client device 112 and server programs such as CGI, Servlet, and a database application installed in the server device 122. In still another embodiment, the server device 122 and the client device 112 may have a configuration of carrying out data transactions with a FTP server application installed in the server device 122 and the client device 112 acting as a FTP client.

The server device 122 stores a log 126 in an appropriate memory space of the server device 122 or the database 124. In this specification, a file made by allowing an information processing apparatus such as a server to accumulate messages about operations of the information processing apparatus is simply referred to as the log 126. In a certain embodiment, for example, the log 126 is generated by allowing the server device 122 to sequentially record information on operations of the server device 122 among transactions carried out between the server device 122 and the client device 112.

The log 126 has high value-added information but is accessible from the outside in various ways because it is often text-based. It is not preferable in terms of security that raw logs be accessible to persons other than persons in charge in highly-limited companies/organizations. Thus, in the embodiment of the present invention, instead of allowing the server function unit 120 to directly access the log, functional means is implemented in the server device 122, the means creating a secure log by masking important basic information and personal information contained in a log, and allowing the server function unit 120 to access the secure log. In this specification, the secure log indicates a data file made by identifying confidential information contained in the log 126 in accordance with the present invention, and modifying (masking or replacing) the confidential information so that the information should not be displayed.

Figure 2:
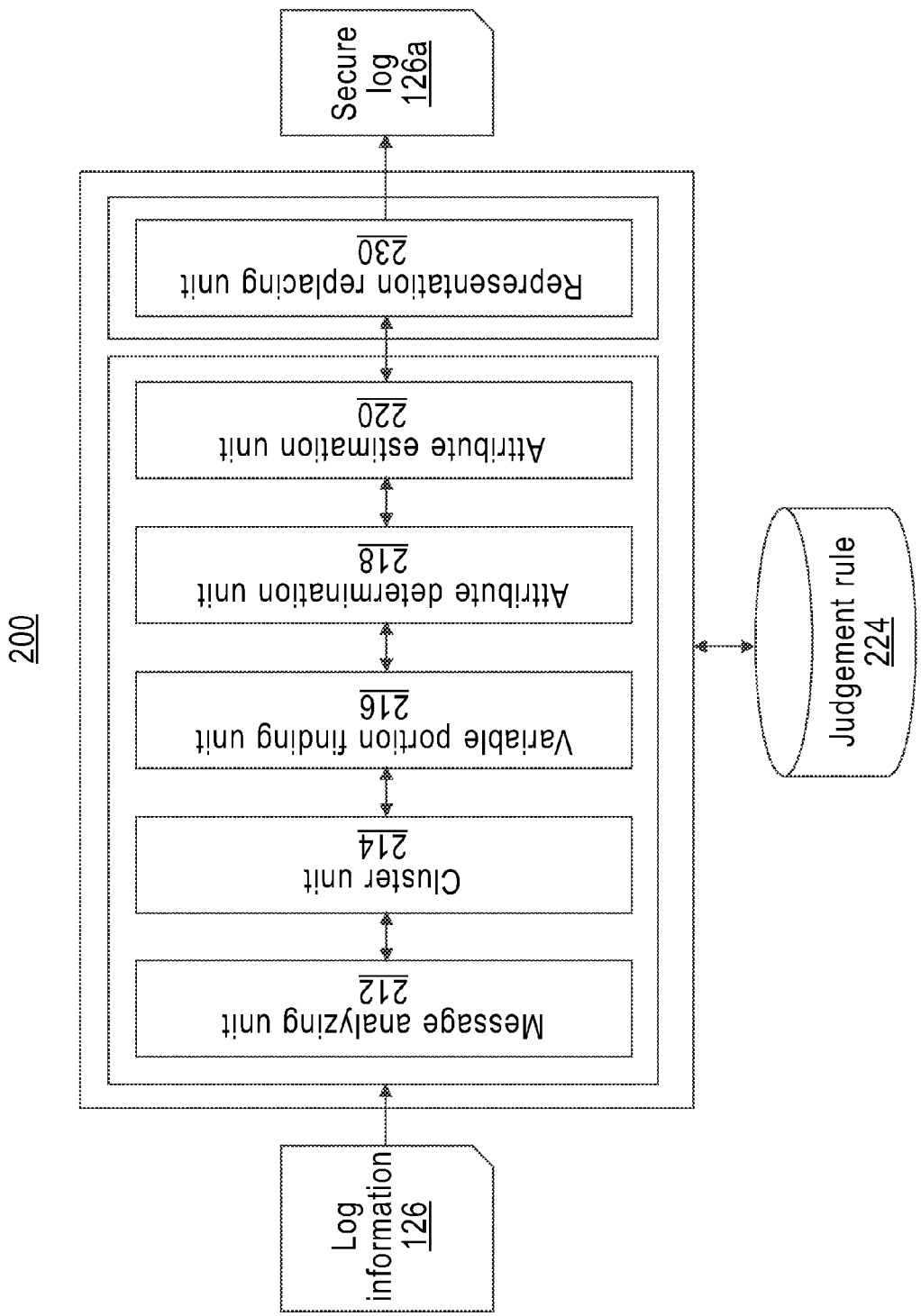
FIG. 2 is a functional block diagram showing a secure-log creating unit 200 used in the embodiment of the present invention.

FIG. 2 is a function block diagram of a secure-log creating unit 200 used in the embodiment of the present invention to identify a highly-confidential area in a log. The secure-log creating unit 200 shown in FIG. 2 can be created by using a program executable by the server device 122, e.g., C++, Java®, Perl, Ruby, or PHP. The secure-log creating unit 200 can be implemented in the server device 122 as, for example, a filtering module configured to control access to a log by using a method other than encryption.

The secure-log creating unit 200 shown in FIG. 2 is configured to, through an appropriate input interface, read out the log 126 created by the server device 122 from a memory space storing the log therein, identify a highly-confidential information in the log 126, and masking the identified information as confidential information through application of various processes. The data file in which the confidential information is masked can be outputted through an output interface and the like as a secure log 126a. When the log 126 is encrypted, the log can be read out by inputting a password or a decryption key prepared to call the secure-log creating unit 200. The way to output the secure log 126a includes: display on a desktop screen; creation of a structured document such as a HTML document or an XML document; creation of a textual document; storage of the created file in an external memory medium such as a hard disk drive; and transmission of the created file through a network, but is not particularly limited thereto. Note that input/output interfaces are not illustrated in FIG. 2 for convenience of explanation.

The secure-log creating unit 200 of the embodiment of the present invention will be further described with reference to FIG. 2. The secure-log creating unit 200 may include a confidential information identifying unit 210 and a representation replacing unit 230. The confidential information identifying unit 210 is configured to identify confidential information contained in the log 126, and the representation replacing unit 230 is configured to replace representation of the confidential information of the log 126 thus identified by the confidential information identifying unit 210 with other characters or the like.

The confidential information identifying unit 210 includes a message analyzing unit 212, a clustering unit 214, and a variable portion finding unit 216. The message analyzing unit 212 includes a parser configured to parse a log, and is capable of quantifying similarities of messages in the log 126 by comparing the messages with a template and sorting the messages in the order of similarities for the subsequent processes. The clustering unit 214 is configured to classify the messages into clusters according to the similarities of the messages. The variable portion finding unit 216 is configured to find, in the messages included in a given cluster, a fixed portion being a fixed and invariable area and a variable portion being an area variable between messages by comparing the messages with each other, and to thereby identify, in each message in the cluster, a location of the variable portion to be processed as a variable. Hereinbelow, in the messages, an area variable between messages is referred to as a variable portion and an area invariable between messages is referred to as a fixed portion.

The confidential information identifying unit 210 also includes an attribute determination unit 218 and an attribute estimation unit 220. The attribute determination unit 218 is configured to judge, by referring to a judgment rule 224, confidentiality-related attributes of a word, a string, code information having a certain rule of regular expression, and the like which have been identified as the variable portions in the messages. For example, the attribute determination unit 218 carries out a search to judge whether each of a word, a string, and a regular expression in the areas identified as the variable portions is registered with the judgment rule 224. If the variable portion being judged is registered with the judgment rule as confidential, such a variable portion is marked as a variable to be masked or replaced as confidential information.

The attribute estimation unit 220 is configured to estimate and judge the confidentiality of variables not registered with the judgment rule 224. In a first embodiment of the estimation and judgment, the attribute estimation unit 220 estimates the confidentiality of such variables in such a way that a variable which appears at the same location in a message as a variable portion judged as confidential according to the judgment rule 224 has the same confidentiality level as the variable portion.

Meanwhile, in a second embodiment of the estimation and judgment, a confidentiality level of a variable portion having an unknown attribute is estimated according to a co-appearance relation between a variable portion judged as confidential and the variable portion having the unknown attribute.

The attribute estimation unit 220 of the embodiment of the present invention estimates the confidentiality level by using not only the judgment rule 224 but also a result of parsing a message. Thereby, the attribute estimation unit 220 is capable of processing not only a word, a string, and a regular expression registered with the judgment rule 224 but also a word, a string, and a regular expression whose confidentiality levels cannot be judged by the judgment rule 224 (these are hereinafter referred to as an unknown portion in the embodiment of the present invention). Note that, in another embodiment, the attribute estimation unit 220 can implement a database function of, after determining a confidential attribute of a word, a string, a character string, a numerical string, code information, or the like which appears at a location of an unknown portion whose confidential attribute should be estimated, additionally registering the data thus estimated with the judgment rule 224. According to the embodiment described above, the confidential information identifying unit 210 is also capable of streamlining the confidential information judgment processing by allowing the judgment rule 224 to study through accumulation of the processing.

The representation replacing unit 230 replaces the original representation of a variable portion judged or estimated as confidential with an alternative representation such as an alternative word, string, or regular expression while maintaining the semantics of the variable portion. Here, the term "while maintaining the semantics" denotes selecting a replacement word which has the meaning or concept that is equivalent or similar to the original word of the variable portion. In the case of a personal name, "Alice" is replaced with "Cathy," and "Bob" is replaced with "David," for example. Meanwhile, a regular expression of an IP address is replaced with code information; for example, "192.168.1.1" is replaced with "192.1.1.2" and "10.1.5.6" is replaced with "167.5.7.8." A place name, a landmark name, a port number, and other variable portions are also replaced with the same or similar replacement words.

Note that, when a false name and an alternative numerical value are used to replace an email address and a port number, the email address after the replacement could be used by a third party and the port number after the replacement might be actually used by a server; to cope with this, when replacing information such as an email address or a port number, the embodiment of the present invention can replace the original information with characters, asterisks, # signs, or other appropriate symbols other than numerical values while leaving enough trace information to guess that the information after the replacement is originally an email address or a port number.

Besides, any known data anonymizing method and data hiding method such as encryption and other replacement methods can be used for replacement. In addition, it is preferable in the replacement of a variable portion to assign the same replacement word or value to variable portions of the same word or value so as to identify the identical words in the original log.

After variable portions judged as confidential are replaced by the representation replacing unit 230, the data after the replacement can be outputted as a data file shown as the secure log 126a. The secure log 126a created by the representation replacing unit 230 can be outputted by transmitting the log through an appropriate output interface as a transmission medium such as a file, or by storing the log in a portable storage medium such as a hard disk drive, a USB memory, or a flexible disk.

The secure log thus created can minimize the risk of confidential information leakage even when external vendors access the log for log analysis or when the log file is provided to external parties. This enables enhancement of usability of logs and improvement of network systems. Incidentally, another reliable application can be used in accessing a raw log to ensure both log accessibility and confidentiality of log analysis; however, this is not the gist of the present application and thus will not be described in detail.

Figure 3:
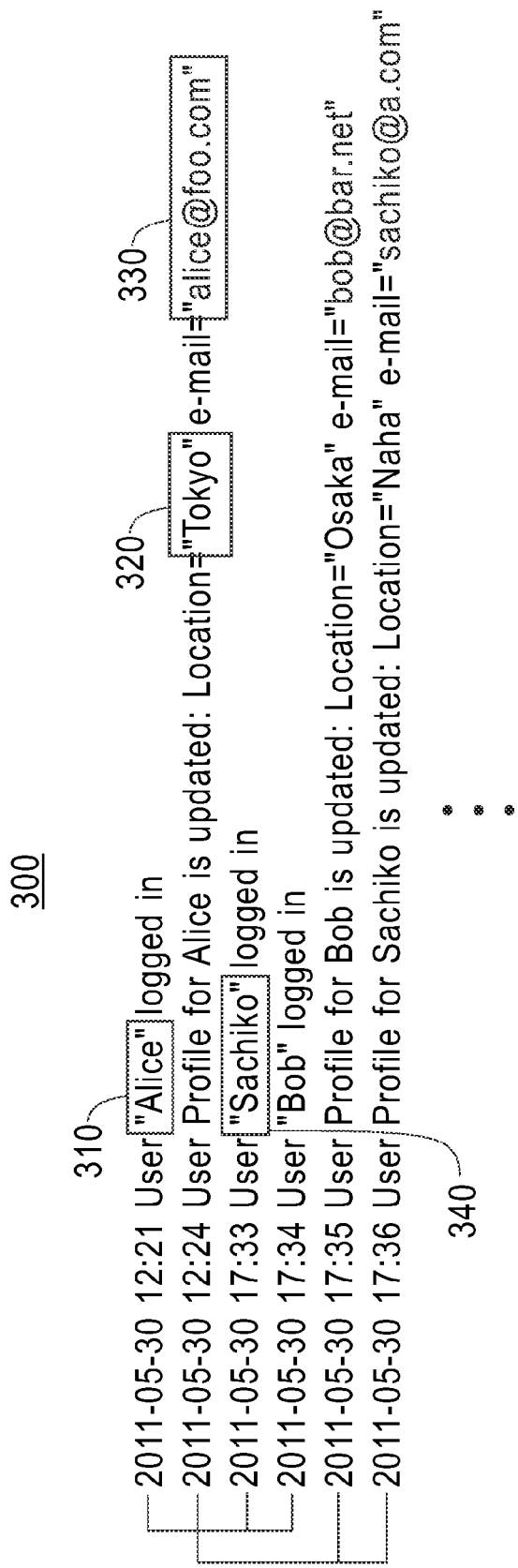
FIG. 3 is a view showing a log 300 to be analyzed in the embodiment of the present invention.

FIG. 3 shows a log 300 to be analyzed in the embodiment of the present invention. The log 300 shown in FIG. 3 includes a personal name 310, a city name 320, and an email address 330. In addition, messages exemplified in the log 300 include login messages, and location information such as "Tokyo" and "Osaka" and information on email address update associated with certain personal names. Further, the log 300 includes "Sachiko" 340 being a string which is probably a Japanese name. It is unrealistic for the judgment rule 224, due to the variety of types of logs and the programming work needed to create the judgment rule 224, to include all of personal information, information which is possibly personal information, and information which should be confidential in association with the personal information.

Besides, no matter how many words are registered with the judgment rule 224, for example, the string "Sachiko" which is probably a Japanese name, could be classified as an unknown portion whose confidentiality level is unknown, if only Western names, such as "Alice" 310 and "Bob," are registered with the judgment rule 224. Thus, merely using the judgment rule cannot guarantee detecting all the confidential information in the log. The embodiment of the present invention enhances detection of confidentiality of the log 300 by estimating the confidentiality level of the unknown portion through message structure analysis.

FIG. 4 shows a list of variable portions, such as words, strings, and regular expressions, registered with the judgment rule 224 of the embodiment of the present invention. In the judgment rule 224, every record of a variable portion is associated with fields, i.e., attributes and a representation of area such as a word, a string, or a regular expression. The attribute is a category corresponding to the semantics of the variable portion. A replacement word for a certain variable portion can be selected based on the category of the variable portion. An IP address is written by using a regular expression. For example, an IP address can be replaced with another private address partially including the original IP address.

The list in FIG. 4 also includes an email address as the attribute. In replacing an email address, a replacement word made by merely replacing a string at the left of "@" mark at random might be an email address actually used; thus, the email address can be anonymized, for example, by replacing the string with "*" (asterisk) or "!" (exclamation mark) in such a way that the replacement word can be recognized as an email address.

In addition, a non-confidential message can also be registered with the judgment rule 224. The non-confidential message is not essential data for the judgment rule 224, but can be registered to streamline parsing by a parser.

Figure 5:
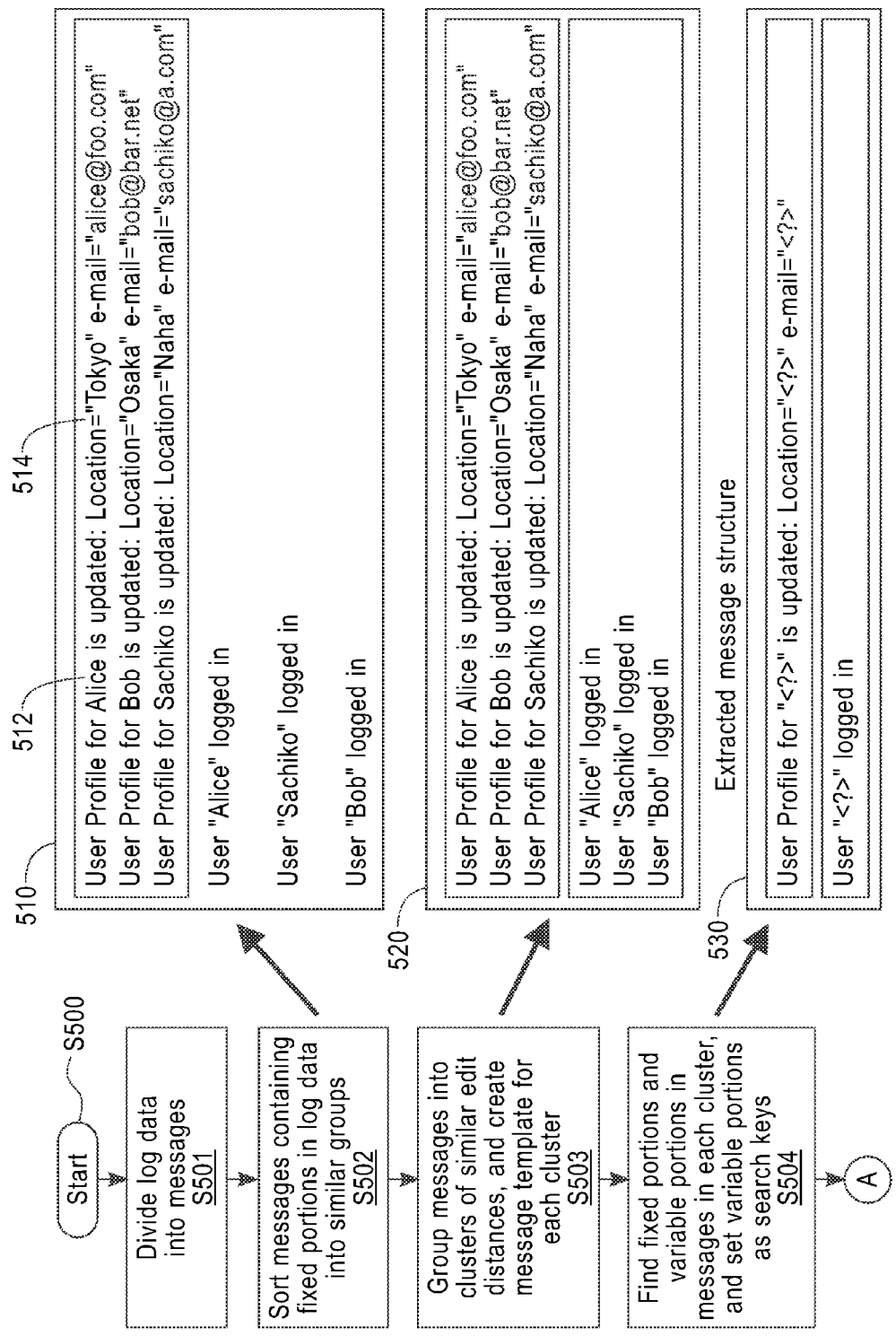
FIG. 5 is a view showing a flowchart of a log analysis method and log analysis data formats, according to the embodiment of the present invention.

Confidential information identification processing and secure log creation processing according to the embodiment of the present invention will be described by using a flowchart and log analysis data formats of FIG. 5. The processing of FIG. 5 starts from Step S500. In Step S501, the message analyzing unit 212 reads log data on a message basis, divides the log data into messages, and calculates an edit distance per message. In Step S502, the messages are sorted according to similarities of the messages by using the calculated edit distances. A message structure 510 obtained in Step S502 is created by sorting the messages according to the similarities of the messages determined based on the edit distances of the messages. In the embodiment of FIG. 5, user-profile update messages and login messages are recognized as different kinds of messages due to lack of similarity. In the message structure 510, the variable portions in the messages 512 and 514 are exemplified, and strings "User Profile for" and "is updated" are fixed portions.

More specifically, a word "Alice" sandwiched between the sentences "User Profile for" and "is updated" is a personal name, and words "Tokyo" and "alice@foo.com" are a city name and an email address, respectively. These are identified as variable portions together with their variable names. As can be understood from the message structure 510, the messages of high similarity have the variable portions which appear in the same order in their sentence structures.

Referring to the flowchart again, in Step S503, the clustering unit 214 groups the sorted messages into clusters according to the similarities of the messages determined from the edit distances. The clustering is carried out depending on how precisely the messages are ranked in the order of similarity by the sorting, and thus is not essential; however, the recognition of variable portions and fixed portions on a cluster basis can make the variable portions more recognizable and can make the variable portions more precisely recognized. FIG. 5 shows a cluster structure 520 created by the clustering of the message structure 510 in Step S503. In the described embodiment, a cluster including the user profile update messages and a cluster including the login messages are identified.

Further, in Step S503, the structure of the fixed portions and the variable portions in the messages forming each cluster is registered as a template structure 530. Specifically, a template is created for associating the locations of the variable portions, i.e., variables in each message in the same cluster, and is stored in an appropriate work memory space. At this time, the cluster of the messages can be indexed as [cluster identification value, edit distance range, template identification value], for example, and the cluster index can be registered in an appropriate memory area of the judgment rule 224.

The template structure may be created per each execution of log processing. However, since similar messages could be generated from one server function unit 120 in many cases, the template structure may be implemented as follows. Specifically, once a cluster index is created, the template structure is registered with the judgment rule 224 as message templates in association with cluster identification values. Upon load of a message to be processed, a cluster into which the message is to be classified is identified from the edit distance of the message, and a confidentiality level of a variable portion in the message is immediately evaluated by using the identified cluster.

In the template structure 530 shown in FIG. 5, each variable portion is shown as "<?>;" however, such representation of the variable portion in the template structure 530 of FIG. 5 is merely an example, and does not mean that every variable portion is identified by a tag of a structured document. The variable portion finding unit 216 is configured to identify variable portions in the template, and can select a method of identifying the variable portions as needed through programming of a specific purpose, such as using the number of words or the number of spaces from the beginning of a message, or finding a double quotation mark used for identifying a variable. In Step S504, the identified variable portions are set as search keys for checking against the judgment rule 224, and the processing proceeds to the next processing from the point A.

Figure 6:
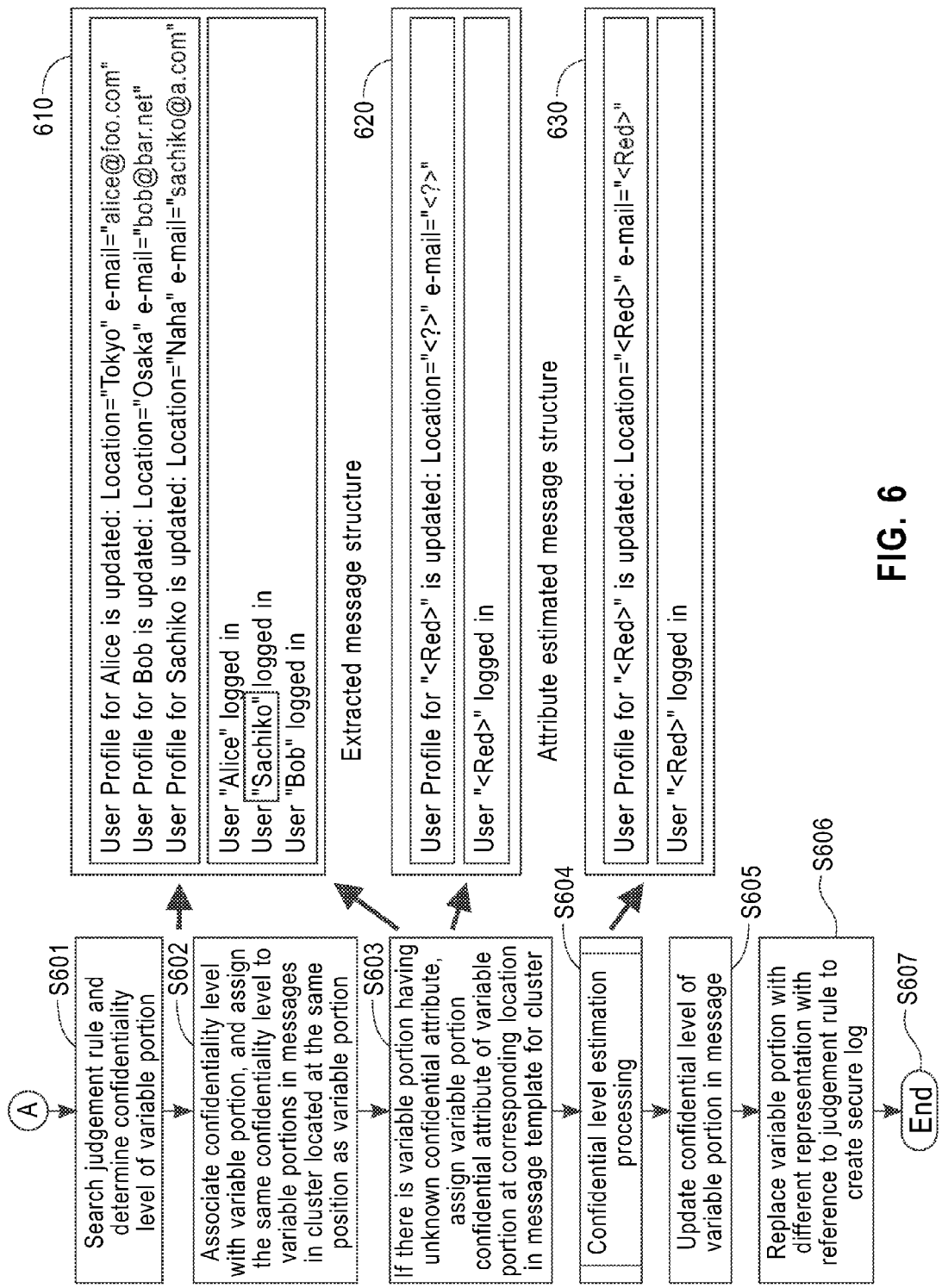
FIG. 6 is a flowchart of processing subsequent to the processing in FIG. 5.

FIG. 6 is a flowchart of processing subsequent to the processing of FIG. 5. In FIG. 6, a confidentiality level of each variable portion is judged in Step S601 by allowing the attribute determination unit 218 to search the judgment rule 224. Then, in Step S602, the confidentiality level obtained by the search is associated with the corresponding template as the confidentiality level for variable portions located at the same position as the variable portion being judged. The confidentiality level can be associated with the template as a structured document such as an XML by parsing and converting the template into a layered structure of word/string/regular expression, or more simply by registering the confidentiality level in a table having a structure of, for example, [template identification value, the number of words from beginning, confidential, the number of words from beginning, non-confidential, the number of words from beginning, confidential].

FIG. 6 shows a result of the judgment of a confidentiality level of each variable portion, by the attribute determination unit 218, by using templates. In a message structure 610, the words "Alice" and "Bob" after the string "User Profile for" have already been registered with the judgment rule 224, and are thus judged as confidential. On the other hand, the word "Sachiko" has not been registered with the judgment rule 224 yet in the described embodiment described, and thus the attribute determination unit 218 returns a value "false" as the search result.

The same applies for the login messages. If the attribute determination unit 218 returns a value=false in Step S602, the secure-log creating unit 200 calls the attribute estimation unit 220. In Step S603, the attribute estimation unit 220 judges and finds a location, in the corresponding template, of the variable portion whose confidential attribute is unknown. Then, the attribute estimation unit 220 sets the confidentiality level, which is assigned to the found appearance location of the template, as a confidentiality level to be assigned by the attribute determination unit 218. The confidentiality level thus set is used for processing of the representation replacing unit 230 to be described later. The above processing is described using a template structure 620.

In a user-profile update template in the template structure 620, the location of the variable portion shown as <Red> has already been registered as a confidential attribute. Hence, if an unknown portion appears at the location of <Red>, a confidential attribute of the unknown portion can be set as confidential. Similarly, a confidential attribute of an unknown portion, which appears at a location shown as <Red> for example in a login template, is set as confidential.

Further, in Step S604, the attribute estimation unit 220 executes confidentiality level estimation processing on a variable portion, which appears at an unprescribed location of a message, by using information other than an appearance location. In the confidentiality level estimation processing, a confidential attribute of an unknown portion, which appears at an unprescribed location of a message, is estimated by using the presence or absence of a confidential portion in the message or a co-appearance relation between the unknown portion and the confidential portion. The confidentiality level estimation processing will be described in detail later. After the processing of Step S604, in Step S605, the attribute estimation unit 220 updates the setting of the confidentiality level of the variable portion in the template whose confidentiality level is unknown, and then passes the processing to the representation replacing unit 230. In Step S606, the representation replacing unit 230 replaces the variable portion with an alternative representation with reference to the judgment rule 224 to create a secure log 126a. Thereafter, in Step S607, the secure log 126a is outputted through an appropriate output interface so as to be accessible by another device, and the processing is terminated.

Figure 7:
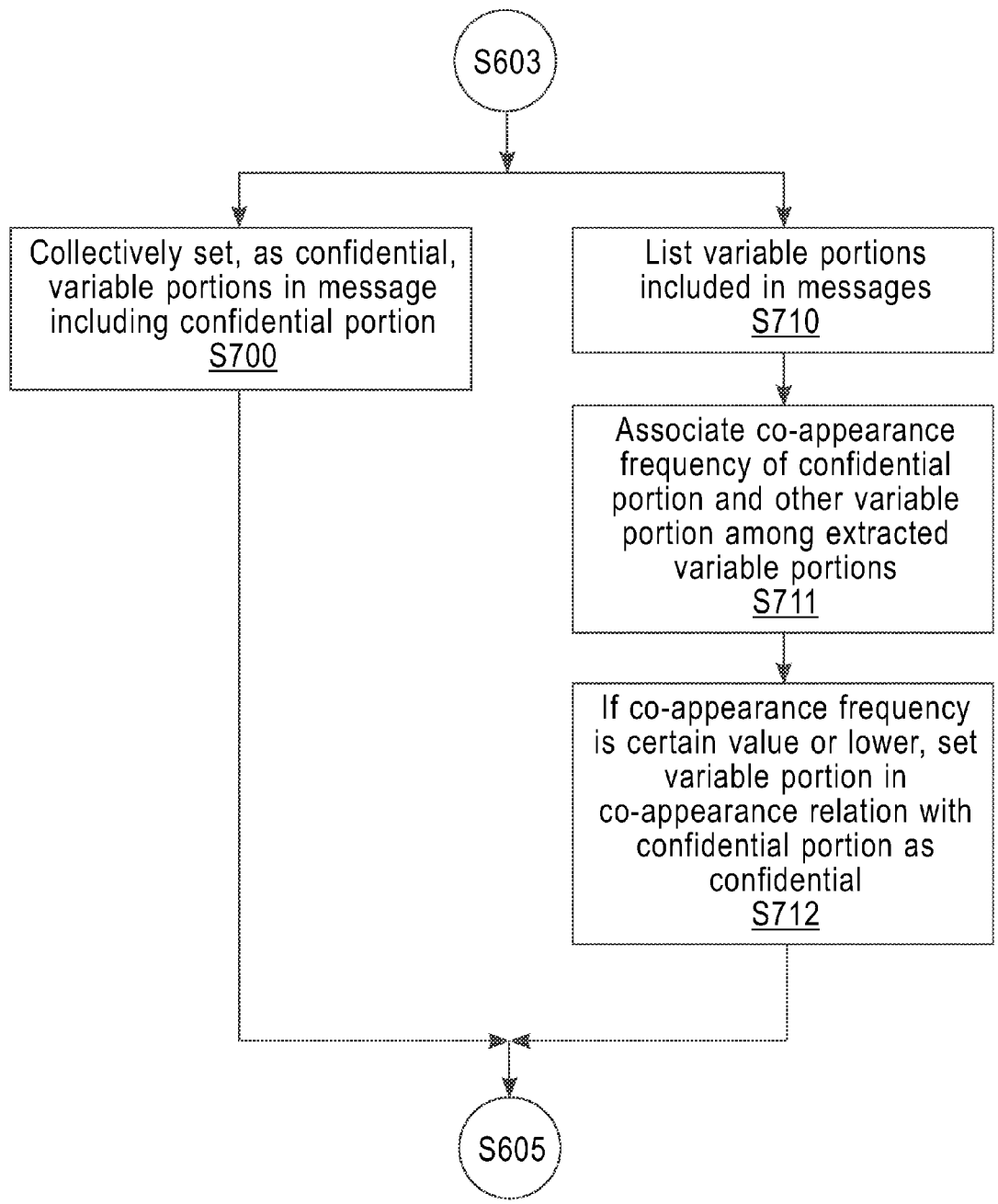
FIG. 7 is a flowchart of confidential level estimation processing described in FIG. 6.

FIG. 7 is a flowchart of the confidentiality level estimation processing described with reference to FIG. 6. The confidentiality level estimation processing is executed by the secure-log creating unit 200 shown in FIG. 2 to estimate a confidentiality level of a variable portion at an unprescribed location, which can be included in a message. The confidential information identification method of the embodiment of the present invention includes two embodiments of estimating a confidentiality level. A first estimation method is to use the presence or absence of a confidential portion in a message (the steps S604-S700-S605), and a second estimation method is to dynamically inferring a confidential attribute of an unknown portion in a message by using a co-appearance relation between a confidential portion and the unknown portion (the steps S600-S710-S-711-S712-S605). According to the present embodiments, the term "co-appearance relation" means that two or more variable portion values appear in the variable portions of the same message at the same time. Besides, the term "co-appearance frequency" means the frequency of a particular set of variable portion values appearing in the message at the same time.

More particularly, for example, assume that an individual name and a particular date appear at the same time in the different variable portions in the same message. The individual name is the confidential portion with high confidential level and the particular date appearing just after thereof could have a special meanings to the individual, such as the birthday of the individual. It is reasonable to assume that the birthday of the individual could be identified when such co-appearance occurs because the co-appearance probability of the variables should be extremely low {(probability of same name for different individual)*(probability of same birthday for different individual)} for the different individuals. That is to say, a variable portion appearing at the same time in the same message may be reasonably estimated to be "confidential" even though its confidentiality attribute is unknown.

Therefore, when the confidential level is estimated by using the co-appearance relation in the present embodiments, it estimates the confidence level of unknown parts by using the co-appearance frequency based on the confidential part and by setting the condition for the co-appearance frequency. The condition therefore may be a particular logical condition about the co-appearance frequency.

Now referring to FIG. 7, the present embodiment of the confidentiality level estimation processing will be detailed. The confidentiality level estimation processing starts when the processing is passed from the step S603. In the first embodiment, it determines the co-appearance frequency for each of message unit in the step S700. If the confidential portion is present, the variable portions present in the message are set to be confidential collectively and then the processing is passed to the step S605.

The second embodiment will be explained below. In the second embodiment, the variable portions included in the massage are listed-up from the message in the step S710. In the step S711, the variable portions appearing commonly with the variable portions categorized to the same characteristics within the log are listed-up; the co-appearance frequencies are calculated and then are allocated to the variable portions.

In the step S712, when the co-appearance frequencies between a string in the confidential portion (A) and a string in the variable portion (B) of which confidential level is unknown are not less than a certain threshold value of TH1, and at the same time the co-appearance frequencies between the string in the variable portion (B) and the string other than those in the confidential portion (A with upper bar) are not more than the threshold value TH2, the currently determining unknown variable portion may be estimated to be confidential. The reason adopting the processing by the above logical condition is, for example, when the value of the variable portion is an individual name which is confidential information, the strings (for example, birthday, e-mail address, password of the individual) which appears together with the individual name in high frequencies should be considered to be confidential.

FIG. 7 shows sample conditions to be used for the estimation of confidential level based on the co-appearance frequency. The condition 730 may be used in the first embodiment that the variable portions co-appearing with the confidential portion are confidential. In the condition 730, the string "Tokyo" and the e-mail address "alice@foo.com" co-appearing with the individual name "Alice" are estimated to be the variable part with high confidentiality level. Besides, the condition 740 is the condition used in the step S712 of the second embodiment.

On the other hand, the condition 740 makes it possible to perform the confidentiality estimation more precisely based on the relation of the confidential portions of unknown portions while requiring plural determinations for co-appearance. Each of the above determination conditions may be implemented on the information processing apparatus depending on the type of the logs and objectives. The case which requires the judgment such as the condition 740 includes the following cases: that is, some of the string, which appears with a confidential variable portion at a high co-appearance frequency, may be a very common word that appears in other messages too. For example, the name of the country in which the person lives may appear with the person name with a high co-appearance frequency, but the same country name may also appear with the name of many other people, because they also live in the same country. In such a case, there is no strong need to replace the country name because it is not strongly confidential. (i.e., given the large number of population in a country, the person is not easily identifiable in the country, and thus the country name does not reveal much privacy about the person). The country name in this example do not only appear with particular individual name "A" but also appears with lot of individual names except for "A" referred to the upper-bared "A" at the same time so that the country name in this example may be estimated not to be confidential.

Alternatively, according to another embodiment, the above threshold is set as needed in such a way that a confidentiality level can be given appropriately according to a specific purpose, whereby a desired security level can be provided.

Here further another embodiment of the present invention will be explained according to the context of FIG. 7. In this embodiment, the confidentiality level estimation processing starts as the processing is passed from Step S604. In Step S700, the attribute estimation unit 220 may choose one of two modes as follows. In the first mode, which is the simplest approach, the attribute estimation unit 220 may judge all the variable portions in the message as being confidential, if any one or more variable portions in the message have been judged as confidential, and then proceed to the processing to Step S605. This is a simplified judgment method which may over-classify some of variable portions as confidential, even if they are not. However, such a simplified approach may be chosen for the sake of the processing speed. Besides, when the second mode is selected, the attribute estimation unit 220 lists variable portions included in messages in Step S710. In Step S711, the attribute estimation unit 220 lists the sets of variable portions which appear in each of the messages, and then calculates the co-appearance frequency of each of the variable portions.

In the step 712, the co-appearance frequency of an unknown portion and the particular confidential portion is higher than a predetermined threshold TH1 and at the same time the co-appearance frequencies between the string in the variable portion (B) and the strings other than those in the confidential portion (A with upper bar) are not more than the threshold value TH2, then the attribute estimation unit 220 determines the variable portion as being confidential. The reason why such processing is employed is as follows. For example, when a variable portion is a personal name that is a confidential information, then a string that appear together with the personal name at a high co-appearance frequency (e.g., the birthday, e-mail address, or a password of the person) can be considered as confidential too.

In this embodiment, the first mode corresponds to setting the threshold for the appearance frequency to 0, where the threshold is used to determine whether or not the unknown portion should be "confidential" in a co-appearance relation between the confidential portion and the variable portion. In other words, all of the variable portions appearing at least one time together with the confidential portion should be confidential, when a confidential portion and unknown portions coexist in the same message and if the confidential portion and the unknown potion appear in the same message at least once or more, as is in the first embodiment. As in the first embodiment, the first mode is a simplified method that may over-classify some of the variable portions as confidential. However, the method does not require a co-appearance frequency check. Accordingly, an embodiment may choose the processing of the attribute estimation unit 220 when reduction of overhead of an information processing is required. After the step S712, the attribute estimation unit 220 proceeds the processing to Step S605, and terminates the confidentiality level estimation processing of FIG. 7. Incidentally, different values may be used as the co-appearance frequency threshold according to an attribute of a variable portion target for co-appearance judgment.

Some messages might have variable portions whose confidential attributes cannot be judged at all by using the judgment rule 224. In this case, the confidential information identifying unit 210 determines a confidential attribute of an unknown portion by estimating the confidential attribute of the unknown portion using an appearance location of the unknown portion first and then using a co-appearance relation, which prevents confidential information from being directly displayed on a secure log. Further, according to another embodiment, it is also possible to streamline the confidential information judgment processing by additionally registering, with the judgment rule 224, data such as words, a string, a character string, a numerical string, code information, or the like which has appeared at a location identified as an unknown portion and whose confidential attribute has been estimated, and thereby allowing the judgment rule 224 to study the data.

Figure 8:
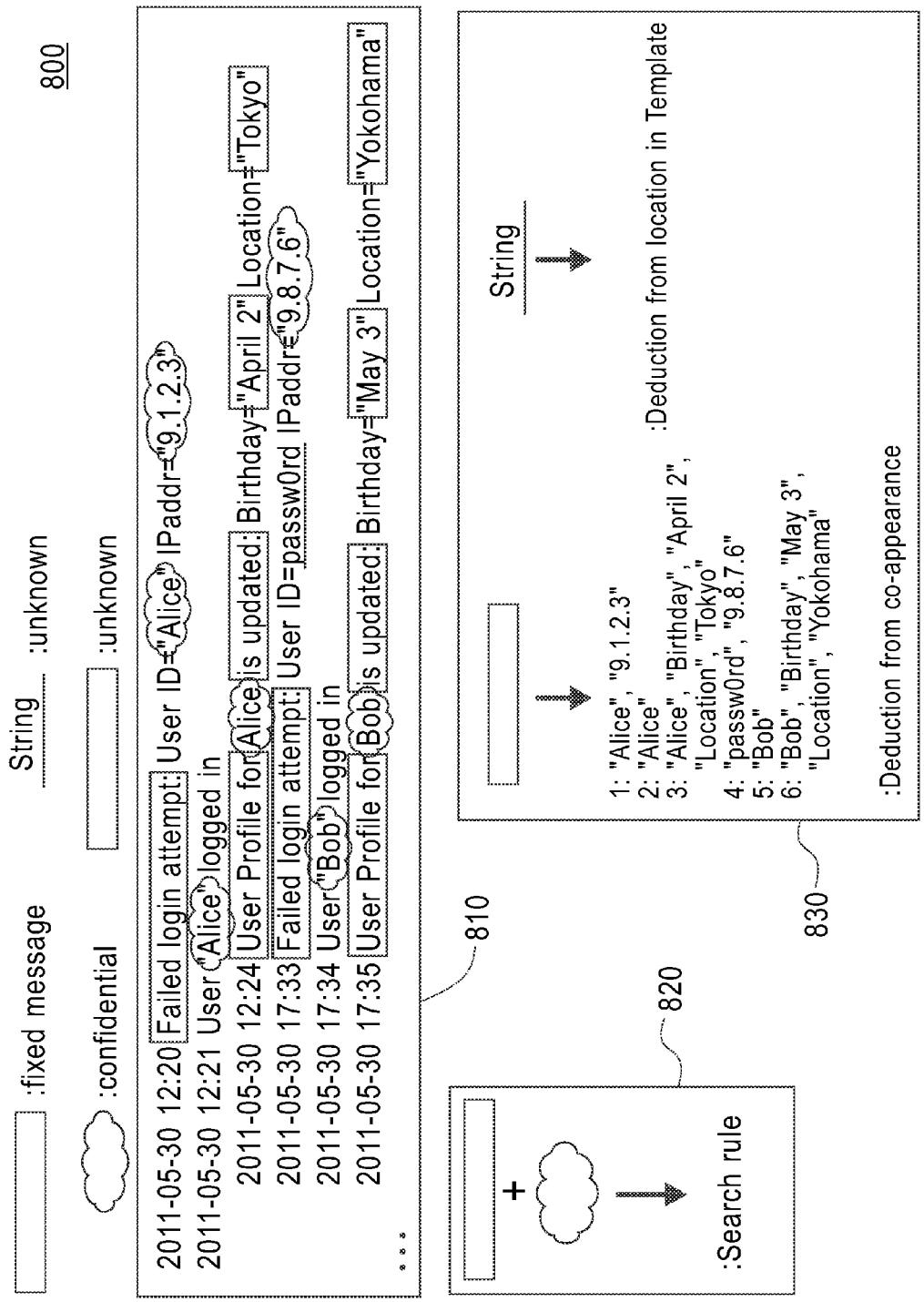
FIG. 8 is a view showing a confidential level judgment mode 800 of the embodiment of the present invention by associating it with a log 810 to be judged.

FIG. 8 is a view showing a confidential level judgment mode 800 of the embodiment of the present invention by associating it with a log 810 to be judged. In FIG. 8, a white rectangle indicates a fixed portion, a variable portion in a cloud is a confidential area, a variable portion in a hatched rectangle is an estimated confidential area, and an underlined variable portion is a confidential area judged by using an appearance location in the corresponding template.

As shown in FIG. 8, a set 820 consists of a fixed message (non-confidential) and a variable portion in a cloud whose confidential attribute has been judged directly by using the judgment rule 224. On the other hand, a set 830 consists of variable portions which have been classified as unknown portions by the judgment rule 224. In the embodiment of the present invention, a confidential attribute of each of the variable portions having been classified as the unknown portions is judged by using a co-appearance relation of the variable portion and an appearance location of the variable portion in a message.

Variable portions whose confidential attributes have been estimated by using a co-appearance relation are a date and a city name with respect to a personal name. Meanwhile, a variable portion whose confidential attribute has been judged by using its appearance location is the variable portion=passw0rd. This variable portion constitutes an unknown portion because a password is inputted by mistake in a portion where a user ID should be inputted and the inputted password is wrongly typed. Of course this explanation is provided only for explanation and the variable portion corresponding to the password may not be registered within the judgement rule. In the embodiment of the present invention, the unknown portion=passw0rd is judged as confidential by using an appearance location of a variable portion in another message of the same cluster, e.g., by using the fact that a confidential area appears right after a variable portion "User ID" in the first line of the log 810.

As has been described, the embodiment of the present invention makes it possible to set a confidential level of a variable portion which has not been registered with the judgment rule 224 yet, and to thereby reduce company/organization risk and enhance log usability.

Figure 9:
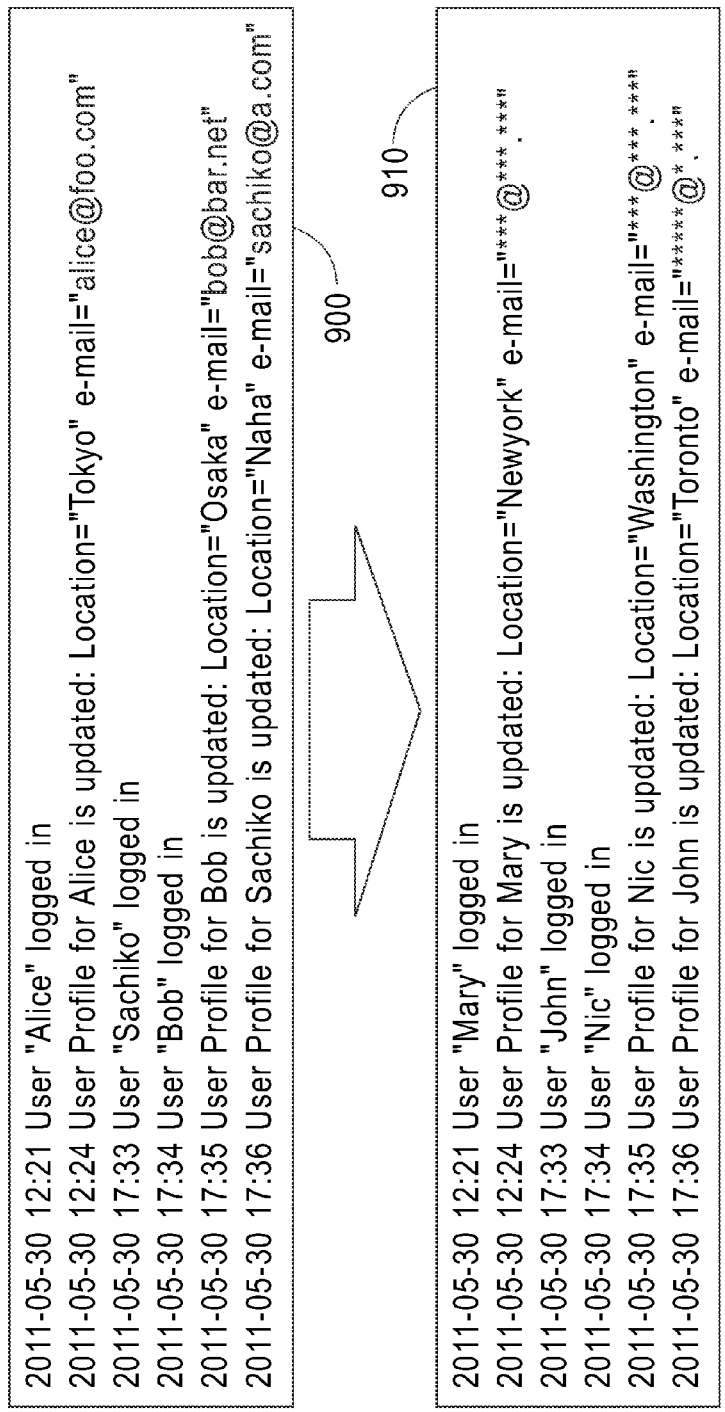
FIG. 9 is a view showing an embodiment of replacement processing executed by a representation replacing unit 230 of the embodiment of the present invention.

FIG. 9 shows an embodiment of replacement processing executed by the representation replacing unit 230 of the embodiment of the present invention. An original log 900 includes multiple confidential areas such as a personal name, a city name, and an email address. The representation replacing unit 230 of the embodiment of the present invention replaces variable portions of each message, which have been registered as confidential, in compliance with a preset protocol. Specifically, the representation replacing unit 230 replaces a personal name/a city name with another value of the same attribute in the judgment rule 224. Note that, if original variable portions are the same, such variable portions are assigned the same representation. In addition, the representation replacing unit 230 replaces an email address with an alternative representation made by changing its alphabets to other characters or numbers in such a way that the alternative representation can be recognized as an email address.

More specifically, personal names "Alice," "Bob," and "Sachiko" in a log 900 are replaced with "Mary," "Nic," and "John," respectively in a secure log 910. City names "Tokyo," "Osaka," and "Naha" in the log 900 are replaced with "New York," "Washington," and "Toronto," respectively. Meanwhile, email addresses are each replaced with other characters while its format "**@*.***" is left so that the replacement word can be recognized as having a representation in compliance with the SMTP protocol. In this respect, a domain name area not used for identifying a person may be left unreplaced in terms of the amount of information to be processed.

Although not illustrated in FIG. 9, replacement of confidential information such as an IP address is carried out by, for example, replacing a global IP address with an appropriate private IP address using part of original numbers. Note that the replacement rule may be stored as a table or list in an appropriate memory space, which is managed by the secure-log creating unit 200, so that required data can be inversely converted and used for reproducing an original log upon request of a high-level administrator such as a server administrator.

The present invention has been described by using specific functional means and the processing executed by the functional means in order to facilitate understanding of the invention. However, besides allowing the above specific functional means to execute the specific processing, the present invention can assign any functional means a function to execute the above processing in consideration of processing efficiency and efficiency of programming and the like for implementation.

The above function of the present invention can be achieved by an apparatus-executable program written in object-oriented programming languages such as C++, Java®, Java Beans, Java Applet, Java Script, Perl, Ruby, and PYTHON, and a dedicated query language such as SQL, and can be distributed by storing it in an apparatus-readable recording medium or by transmitting it.

The present invention has been described by using the specific embodiment. However, the present invention is not limited to the above embodiment, but modification can be made to the present invention, such as creation of another embodiment, addition, change, and deletion, as long as those skilled in the art can arrive at such modification, and any mode is included in the scope of the present invention as long as the mode brings about the operation and effect of the present invention.

LIST OF REFERENCE NUMERALS

100 . . . information processing system,
102 . . . client,
110 . . . network,
112 . . . client device,
120 . . . server function unit,
122 . . . server device,
124 . . . database,
126 . . . log,
126a . . . secure log,
200 . . . secure-log creating unit,
210 . . . confidential information identifying unit,
212 . . . message analyzing unit,
214 . . . clustering unit,
216 . . . variable portion finding unit,
218 . . . attribute determination unit,
220 . . . attribute estimation unit,
224 . . . judgment rule,
230 . . . representation replacing unit.

What is claimed is:

1. A method of allowing an information processing apparatus to identify confidential information in an accumulated log, the method comprising:
reading messages about operations of information processing apparatuses from the log, and classifying the read messages into clusters according to similarities of the messages;
finding portions variable between messages in the messages in each of the clusters;
trying to determine a confidential attribute of the variable portions by using predefined rules; and
in a case where there is a portion whose confidential attribute is undeterminable by using the rule, determining the confidential attribute of the portion having the undeterminable confidential attribute, by estimating the confidential attribute from another portion having a determined confidential attribute;
wherein the step of estimating and determining the confidential attribute includes the step of estimating the confidential attribute with use of a correspondence between an appearance location in the messages of the portion having the undeterminable confidential attribute and an appearance location in the messages of the portion having the determined confidential attribute.

2. The method according to claim 1, further comprising the step of creating a secure log by replacing a representation of the variable portion in the messages with an alternative representation according to the confidential attribute thus determined.

3. The method according to claim 2, wherein the step of creating the secure log by replacing the representation of the variable portion in the messages with an alternative representation includes the step of selecting an alternative representation having same semantics as the variable portion and replacing the variable portion with the selected alternative representation.

4. The method according to claim 2, further comprising the step of, if portions in more than two messages originally have an identical representation, selecting the identical representation as an alternative representation for the portions in the secure log.

5. The method according to claim 2, further comprising the step of outputting only the secure log to outside of the information processing apparatus.

6. The method according to claim 1, wherein the step of estimating and determining the confidential attribute includes the step of estimating the confidential attribute of the portion having the undeterminable confidential attribute with use of a co-appearance frequency of the portion having the determined confidential attribute and the portion having the undeterminable confidential attribute.

7. The method according to claim 1, further comprising the step of quantifying the similarities of the messages by using edit distances of letters, characters, and spaces which form the messages.

8. The method according to claim 1, wherein the variable portion is any of words, strings, or code information which form the messages and the words, strings, or code information being written according to a rule of regular expression.

9. The method according to claim 1, wherein the rule is formed according to semantics of each of the portions by classifying and registering any of words, strings, or code information to be confidential, where the words, strings or the code information being written according to a rule of regular expression.

10. The method according to claim 1, wherein the step of estimating the confidential attribute with use of the correspondence between the appearance location in the messages of the portion having the undeterminable confidential attribute and the appearance location in the messages of the portion having the determined confidential attribute includes the steps of:
checking the portion having the undeterminable confidential attribute in the message against a template in which a confidential attribute is associated with an appearance location of each variable portion in the messages in each of the clusters; and determining the confidential attribute of a variable portion in the message if the variable portion in a same appearance location in the template has the confidential attribute.

11. The method according to claim 10, wherein, in the step of estimating and determining the confidential attribute the variable portion in the template, such that if any of the messages in a same cluster includes at least one confidential portion then the confidential attribute of the variable portion in the template is estimated as confidential.

12. The method according to claim 1, wherein the step of estimating and determining the confidential attribute includes the step of, setting the confidential attribute of the portion having the undeterminable confidential attribute as confidential depending on a condition in a co-appearance frequency of a portion to be confidential and the portion having the undeterminable confidential attribute.

13. The method according to claim 1, further comprising the step of performing learning by additionally registering, in the rule, data on the portion whose confidential attribute is estimated and determined.

14. An information processing apparatus of identifying confidential information in a log, the information processing apparatus comprising:
   a clustering unit configured to read messages about operations of information processing apparatuses from the log, and classify the read messages into clusters according to similarities of the messages;
   a variable portion finding unit configured to find portions variable between messages in the messages in each of the clusters;
   an attribute determination unit configured to estimate and determine a confidential attribute of the variable portions by using predefined rules; and
   an attribute estimation unit configured to, in a case where there is a portion whose confidential attribute is undeterminable by using the rule, determine the confidential attribute of the portion having the undeterminable confidential attribute by estimating the confidential attribute with use of either a correspondence between an appearance location in the messages of the portion having the undeterminable confidential attribute and an appearance location in the messages of a portion having a determined confidential attribute, or a co-appearance frequency of the portion having the determined confidential attribute and the portion having the undeterminable confidential attribute;
   wherein the step of estimating and determining the confidential attribute includes estimating the confidential attribute with use of a correspondence between an appearance location in the messages of the portion having the undeterminable confidential attribute and an appearance location in the messages of the portion having the determined confidential attribute.

15. The information processing apparatus according to claim 14, further comprising:
   a message analyzing unit configured to read the messages from the log and sort the messages in an order of the similarities of the messages; and
   a representation replacing unit configured to create a secure log by replacing a representation of the variable portion in the messages with an alternative representation according to the confidential attribute thus determined, wherein
   the message analyzing unit quantifies the similarities of the messages by using edit distances of letters, characters, and spaces which form the messages.

16. The information processing apparatus according to claim 14, wherein the variable portion is any of words, strings, and code information which form the messages, where the words, strings, and the code information being written according to a rule of regular expression.

17. A computer program product for allowing an information processing apparatus to identify confidential information in an accumulated log, the computer program product comprising:
   a non-transitory apparatus-readable recording medium; and
   computer program instructions for
      reading messages about operations of information processing apparatuses from the log, and classifying the read messages into clusters according to similarities of the messages,
      finding portions variable between messages in the messages in each of the clusters,
      trying to determine a confidential attribute of the variable portions by using predefined rules, and
      in a case where there is a portion whose confidential attribute is undeterminable by using the rule, determining the confidential attribute of the portion having the undeterminable confidential attribute, by estimating the confidential attribute from another portion having a determined confidential attribute;
   wherein the step of estimating and determining the confidential attribute includes estimating the confidential attribute with use of a correspondence between an appearance location in the messages of the portion having the undeterminable confidential attribute and an appearance location in the messages of the portion having the determined confidential attribute.

* * * * *